(12) United States Patent
Zheng et al.

(10) Patent No.: US 12,372,610 B2
(45) Date of Patent: Jul. 29, 2025

(54) METHOD AND SYSTEM FOR PROCESSING RADAR SIGNAL BASED ON PHOTONIC FRACTIONAL FOURIER TRANSFORMER

(71) Applicant: Tsinghua University, Beijing (CN)

(72) Inventors: Xiaoping Zheng, Beijing (CN); Guanyu Han, Beijing (CN); Shangyuan Li, Beijing (CN); Xiaoxiao Xue, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 407 days.

(21) Appl. No.: 17/819,966

(22) Filed: Aug. 16, 2022

(65) Prior Publication Data

US 2022/0390556 A1 Dec. 8, 2022

Related U.S. Application Data

(63) Continuation of application No. PCT/CN2021/097466, filed on May 31, 2021.

(30) Foreign Application Priority Data

Jun. 24, 2020 (CN) .......................... 202010586479.7

(51) Int. Cl.
*G01S 7/35* (2006.01)
*G01S 13/34* (2006.01)

(52) U.S. Cl.
CPC .............. *G01S 7/356* (2021.05); *G01S 7/358* (2021.05); *G01S 13/343* (2013.01)

(58) Field of Classification Search
CPC ........ G01S 7/356; G01S 7/358; G01S 13/343; G01S 13/288; G01S 13/08; G01S 7/2923; G01S 7/352
See application file for complete search history.

(56) References Cited

U.S. PATENT DOCUMENTS

| 8,849,129 | B2* | 9/2014 | Bhandare | ............. | H04B 10/532 |
| | | | | | 398/198 |
| 2019/0265351 | A1* | 8/2019 | Madison | ................. | G01S 17/10 |

FOREIGN PATENT DOCUMENTS

| CN | 104793198 | | 7/2015 | | |
| CN | 104793198 | A * | 7/2015 | ............. | G01S 13/32 |

(Continued)

OTHER PUBLICATIONS

CN109387833B_Description_20240923_1223.pdf—translation of CN109387833B (Year: 2020).*

(Continued)

*Primary Examiner* — Vladimir Magloire
*Assistant Examiner* — Yonghong Li
(74) *Attorney, Agent, or Firm* — Hodgson Russ LLP

(57) ABSTRACT

A method for processing a radar signal based on a photonic fractional Fourier transformer comprises: transmitting a linear frequency modulation signal to targets to be detected, receiving echo signals of the targets to be measured, and loading the linear frequency modulation signal and the echo signals onto a single-frequency optical wave by an electro-optical modulator (S1); respectively biasing a sub-modulator and a parent modulator of the electro-optical modulator at different bias points, modulating the single-frequency optical wave by the electro-optical modulator based on the linear frequency modulation signal and the echo signals, and outputting a modulated optical signal (S2); converting the modulated optical signal by a photoelectric detector to a photocurrent (S3); and performing Fourier transform on the photocurrent to obtain a fractional Fourier spectrum, and obtaining distance information of the targets to be measured according to peak positions of each pulse signal in the fractional Fourier spectrum (S4).

9 Claims, 5 Drawing Sheets

(56) References Cited

FOREIGN PATENT DOCUMENTS

| CN | 107846254 | | 3/2018 | |
|---|---|---|---|---|
| CN | 108802698 | A | 11/2018 | |
| CN | 110031832 | | 7/2019 | |
| CN | 109387833 | B * | 4/2020 | ............. G01S 13/86 |

OTHER PUBLICATIONS

CN104793198A—Location method and device and fuse control system—Google Patents.pdf—translation of CN104793198A (Year: 2015).*
CN109387833_Fig2_translate.pdf (Year: 2020).*
RP Photonics Encyclopedia—photocurrent, photoelectric effect, photodiode.pdf (Year: 2020).*
Schnébelin, Côme, and Hugues Guillet de Chatellus. "Agile photonic fractional Fourier transformation of optical and RF signals." Optica 4, No. 8 (2017): 907-910. (Year: 2017).*
CNIPA, Office Action for CN Application No. 202010586479.7, Dec. 2, 2022.
WIPO, International Search Report for PCT/CN2021/097466, Aug. 26, 2021.

* cited by examiner

METHOD AND SYSTEM FOR PROCESSING RADAR SIGNAL BASED ON PHOTONIC FRACTIONAL FOURIER TRANSFORMER

CROSS REFERENCE TO RELATED APPLICATIONS

This application is a continuation of International Application No. PCT/CN2021/097466, filed on May 31, 2021, which claims priority to Chinese Patent Application No. 202010586479.7, filed on Jun. 24, 2020, the entire disclosures of which are incorporated herein by reference.

TECHNICAL FIELD

The disclosure relates to the field of signal processing technologies, and in particular to a method, a system and an apparatus for processing a radar signal based on a photonic fractional Fourier transformer.

BACKGROUND

Fractional Fourier transform is one of the important signal processing means, which may convert non-stationary wideband signals into stationary narrowband signals in fractional domain by way of rotating the time-frequency plane. Therefore, it is widely used in the fields of processing radar, communication and sonar signals. With the development of high-precision and high-resolution radar detection, high-speed and high-capacity wireless communication, the requirements of various systems for the bandwidth and center frequency of the transmitted signals are increasing. The traditional fractional Fourier transform based on electronic sampling and digital signal processing has been difficult to meet the growing demands for rapid signal processing due to the limited bandwidth of electronic sampling devices, serious electromagnetic interference and a huge data amount of digital signal processing. Due to the characteristics of high frequency, wide band and anti-electromagnetic interference of microwave photonic technology, the signal processing method based on photonics has the advantages of large bandwidth and high center frequency.

SUMMARY

According to a first aspect of the disclosure, a method for processing a radar signal based on a fractional photon Fourier transformer includes: transmitting by a radar transmitter, a linear frequency modulated signal to targets to be measured, and receiving by a radar receiver, echo signals of the targets to be measured, and loading by an electro-optical modulator, the linear frequency modulated signal and the echo signals on a single-frequency light wave generated by a single-frequency light source; biasing a sub-modulator and a parent modulator in the electro-optical modulator at different bias points respectively, modulating by the electro-optical modulator, the single-frequency light wave based on the linear frequency modulation signal and the echo signals, and outputting a modulated optical signal; converting by a photoelectric detector, the modulated optical signal to a photocurrent; and obtaining a fractional Fourier spectrum by performing Fourier transform on the photocurrent, and obtaining distance information of the targets to be measured based on peak positions of each pulse signal in the fractional Fourier spectrum.

According to a second aspect of the disclosure, a system for processing a radar signal based on a photonic fractional Fourier transformer includes: a radar transmitter, a radar receiver, a single-frequency light source, an electro-optical modulator, a bias point control module, a photoelectric detector, a digital signal processing module.

The radar transmitter is configured to transmit a linear frequency modulated signal to targets to be measured.

The radar receiver is configured to receive echo signals of the targets to be measured.

The single-frequency light source is configured to generate and input a single-frequency light wave to the electro-optical modulator.

The bias point control module includes three tunable DC power supplies and is configured to bias a sub-modulator and a parent modulator in the electro-optical modulator at different bias points respectively.

The electro-optical modulator has an input end for inputting the single-frequency light wave, the linear frequency modulation signal and the echo signals, and an output end connected to an input end of the photoelectric detector. The electro-optical modulator is configured to modulate the single-frequency light wave based on the linear frequency modulation signal and the echo signals, and send a modulated optical signal to the photoelectric detector.

The photoelectric detector has an output end connected to an input end of a digital signal processing module. The photoelectric detector is configured to convert the modulated optical signal into a photocurrent, and send the photocurrent to the digital signal processing module.

The digital signal processing module includes an analog-to-digital converter and a computer and is configured to obtain a fractional Fourier spectrum by performing Fourier transform on the photocurrent, and obtain distance information of the targets to be measured based on peak positions of each pulse signal in the fractional Fourier spectrum.

The additional aspects and advantages of the disclosure will be partly given in the following description, and some will become apparent from the following description, or be understood through the practice of the disclosure.

BRIEF DESCRIPTION OF THE DRAWINGS

The above and/or additional aspects and advantages of the disclosure will become apparent and readily understood from the following description of embodiments taken in conjunction with the accompanying drawings.

DETAILED DESCRIPTION

Embodiments of the disclosure are described in detail below. Examples of the embodiments are shown in the accompanying drawings, throughout which the same or similar reference numbers indicate the same or similar elements or the elements with the same or similar functions. The embodiments described below with reference to the drawings are exemplary, and are intended to explain the disclosure, but should not be understood as a limitation to the disclosure.

In actual scenes of radar detection, the targets are usually non-cooperative, of which the number and locations are unknown. Therefore, in a non-cooperative multiple targets scenario, since the nonlinear effect of modulators and photoelectric detectors leads to interactions between multiple echoes, a Ghost target component occurs in a fractional domain spectrum, and it is difficult to distinguish the Ghost target from the real target since the amplitude and position of the Ghost target are close to those of real target.

For the above technical problem, a method, a system and an apparatus for processing a radar signal based on a photonic fractional Fourier transformer are proposed according to the embodiments of the disclosure, which are described below with reference to the accompanying drawings.

First, the method for processing a radar signal based on a photonic fractional Fourier transformer according to the embodiments of the disclosure will be described with reference to the accompanying drawings.

Figure 1:
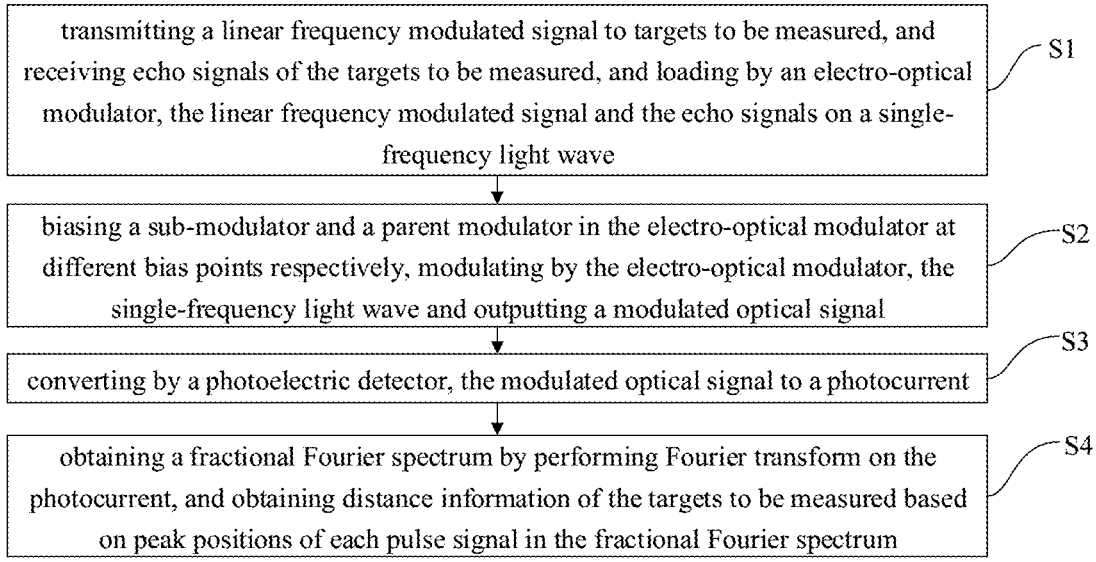
FIG. 1 is a flowchart of a method for processing a radar signal based on a photonic fractional Fourier transformer according to an embodiment of the disclosure.

FIG. 1 is a flowchart of a method for processing a radar signal based on a photonic fractional Fourier transformer according to an embodiment of the disclosure.

As shown in FIG. 1, the method for processing a radar signal based on a photonic fractional Fourier transformer includes the following steps at S1-S4.

At S1, a linear frequency modulated signal is transmitted to targets to be measured, and echo signals of the targets to be measured are received, and the linear frequency modulated signal and the echo signals are loaded on a single-frequency light wave by an electro-optical modulator.

Specifically, a radar transmitter may transmit the linear frequency modulated signal to the targets to be measured within a detection range. The echo signals are generated when the linear frequency modulated signal hits the targets to be measured and is received by a radar receiver.

In the embodiment of the disclosure, the transmitted linear frequency modulated signal is:

$$s_0(t) = \exp j(2\pi f_0 t + \pi k t^2)$$

where $f_0$ is an initial frequency of the linear frequency modulated signal used, and k is a chirp rate of a linear frequency modulated waveform used.

The received echo signals are:

$$s_r(t) = \sum_{i=1}^{n} r_i \exp j\left[2\pi f_0(t - \tau_i) + \pi k(t - \tau_i)^2\right]$$

where $r_i$ is an amplitude of the i-th target echo, $\tau_i$ is a delay of the i-th target echo, and n is a number of targets.

The single-frequency light wave in the embodiment of the disclosure is generated by a single-frequency light source, the single-frequency light wave is input into the electro-optical modulator, and the linear frequency modulation signal and the echo signals are simultaneously input into the electro-optical modulator.

At S2, a sub-modulator and a parent modulator in the electro-optical modulator are biased at different bias points respectively, the single-frequency light wave is modulated by the electro-optical modulator, and a modulated optical signal is output.

It may be understood that, the fractional domain spectrum is manipulated by controlling the bias points of the electro-optical modulator to perform spectral processing, thus realizing the cancellation of two Ghost target component sources.

Specifically, when the electro-optical modulator is a dual-parallel modulator, the two sub-modulators and the parent modulator in the dual-parallel modulator are respectively biased at a quadrature bias point, a suppressed carrier point and a maximum transmission point. The corresponding phase is biased as:

$$\phi_1 = \pi/4, \phi_2 = \pi/2, \phi_3 = 0.$$

At S3, a photocurrent is obtained by a photoelectric detector converting the optical signal.

After the electro-optical modulator is biased, the optical signal may be output through modulation of the electro-optical modulator, and the optical signal may be input into the photoelectric detector (PD) to convert the optical signal into the photocurrent.

At S4, a fractional Fourier spectrum is obtained by performing Fourier transform on the photocurrent, and distance information of the targets to be measured is obtained based on peak positions of each pulse signal in the fractional Fourier spectrum.

Specifically, Fourier transform to the obtained photocurrent is performed to obtain a fractional Fourier spectrum without Ghost targets, and the distance information of the target is obtained in the following formula based on the peak positions of each pulse signal in the fractional Fourier spectrum:

$$L_i = \tau_i c/2 = |f_i' c/2k|,$$

where $L_i$ is a distance between the i-th target and a transmitting point of the linear frequency modulated signal, $f_i'$ is a peak position of the i-th target in the fractional Fourier spectrum, c is the light speed, and $\tau_i$ is the delay from the delay of the i-th target echo, and k is a chirp rate of the linear frequency modulated waveform used.

Specifically, the radar transmitter and the radar receiver used in the embodiments of the disclosure may be integrated into the same device, and the obtained target position information may be regarded as a distance from the transmitting point of the linear frequency modulated signal, or a distance from the receiving point of the echo signals.

Figure 2:
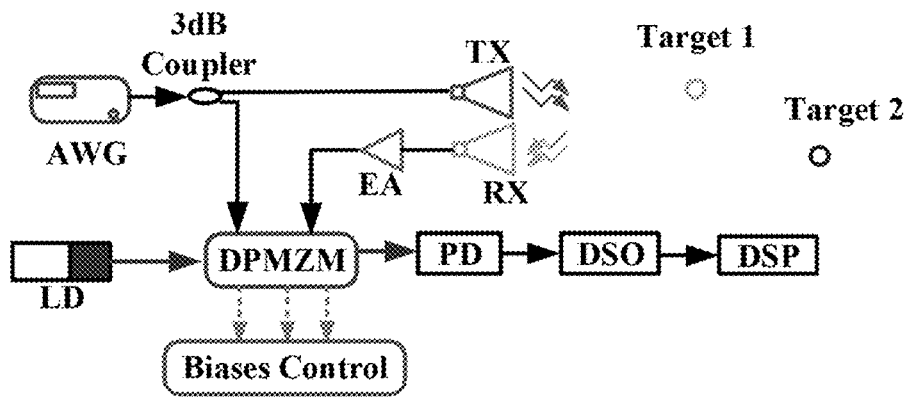
FIG. 2 is a structural diagram of a photonic fractional Fourier transformer according to an embodiment of the disclosure.
Figure 3:
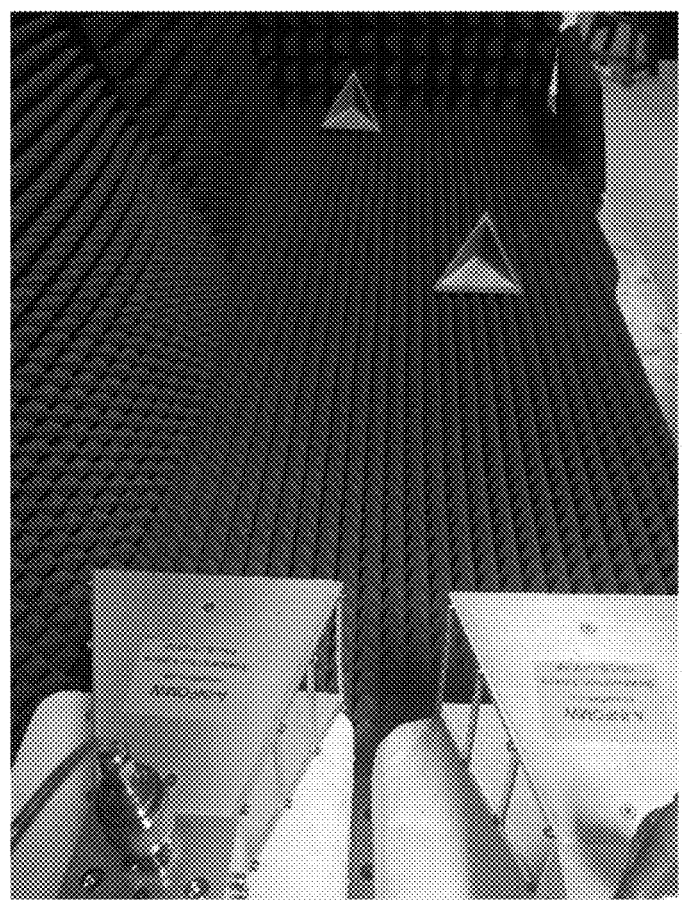
FIG. 3 is a physical diagram of a dual-target detection experiment according to an embodiment of the disclosure.
Figure 4:
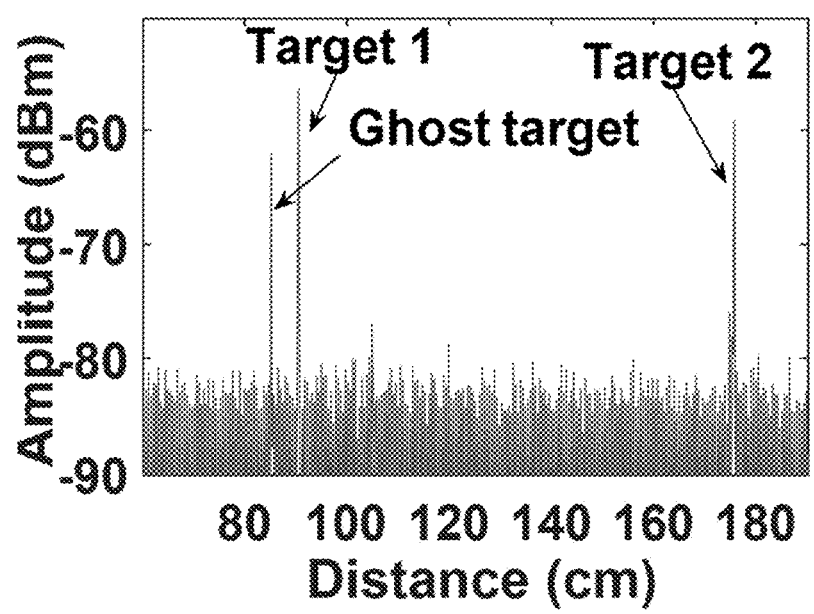
FIG. 4 is a schematic diagram of a detection result when two sub-modulators of a dual-parallel modulator are both biased at a suppressed carrier point according to an embodiment of the disclosure.
Figure 5:
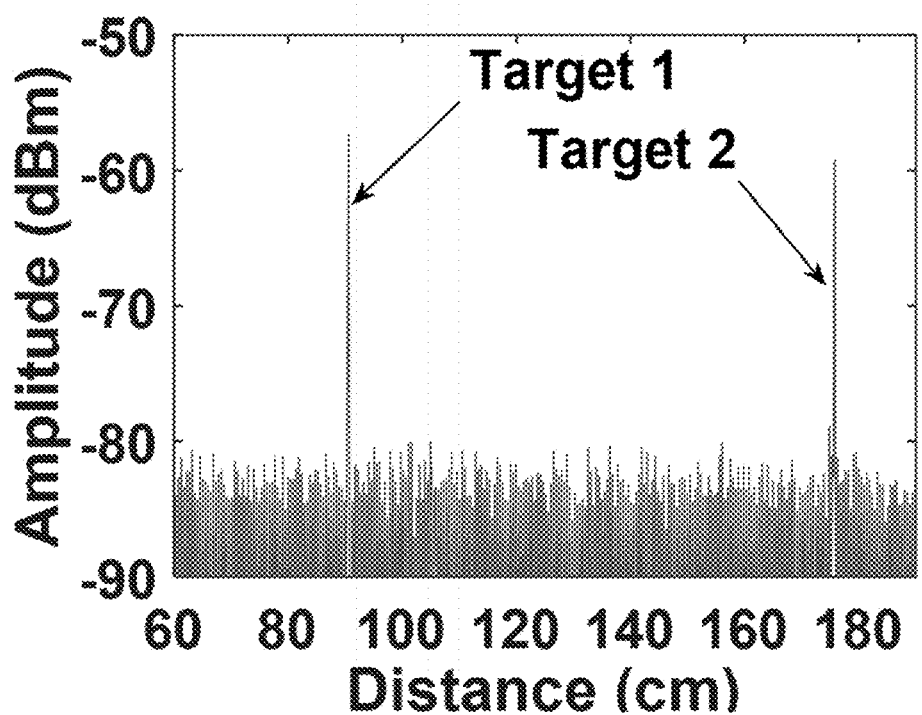
FIG. 5 is a schematic diagram of a detection result when two sub-modulators of a dual-parallel modulator are biased at a quadrature bias point and at a suppressed carrier point, respectively.

As shown in FIG. 2, a dual target detection experiment is performed by using a photonic fractional Fourier transformer based on a dual parallel modulator. The radar signal used in the experiment is X-band (8-12 GHz), which is generated by any waveform generator (AWG). The generated signal is divided into two paths, one of which is amplified and filtered by electric power and enters a transmitting antenna for target detection, and the other is input to one microwave input port of the dual parallel modulator. The echo of the target is received by a receiving antenna, amplified by a low noise amplifier, and input to the other microwave input port of the dual parallel modulator. A bias point control circuit controls three bias points of the dual parallel modulator. A photocurrent is generated after the PD detects an output optical signal of the dual parallel modulator. After sampling by a digital storage oscilloscope (DSO) and digital signal processing (DSP), target distance information within a detection range may be obtained. The physical map of the dual-target detection experiment is shown in FIG. 3. The two targets are placed at 90 cm and 175 cm from the antenna, respectively. FIG. 4 shows a detection result of two sub-modulators of the dual-parallel modulator biased at a suppressed carrier point. Without spectral processing, it may be found that there is a Ghost target at 85 cm. FIG. 5 shows a detection result when MZM1 of the dual parallel modulator is biased at a quadrature bias point and MZM2 of the dual parallel modulator is biased at a suppressed carrier point. After spectral processing, it may be found that the Ghost target may be eliminated, while the real target is retained.

According to the method for processing a radar signal based on a photonic fractional Fourier transformer in the embodiment of the disclosure, the linear frequency modulated signal is transmitted to the targets to be measured, the echo signals of the targets to be measured is received, the linear frequency modulated signal and the echo signals are loaded by the electro-optical modulator on the single-frequency light wave; the sub-modulator and the parent modulator in the electro-optical modulator are biased at different bias points, the single-frequency light wave is modulate by the electro-optical modulator, and the modulated optical signal is outputted; the optical signal is converted by the photoelectric detector to the photocurrent; the fractional Fourier spectrum is obtained by performing Fourier transform on the photocurrent, and the distance information of the targets to be measured is obtained based on the peak positions of each pulse signal in the fractional Fourier spectrum. Thus, the radar signals with high frequency and wide band are converted into fractional-domain signals with low frequency and narrow band, and the interference of Ghost target components on the radar detection results is eliminated.

Next, the system for processing a radar signal based on a photonic fractional Fourier transformer proposed according to the embodiments of the disclosure will be described with reference to the accompanying drawings.

Figure 6:
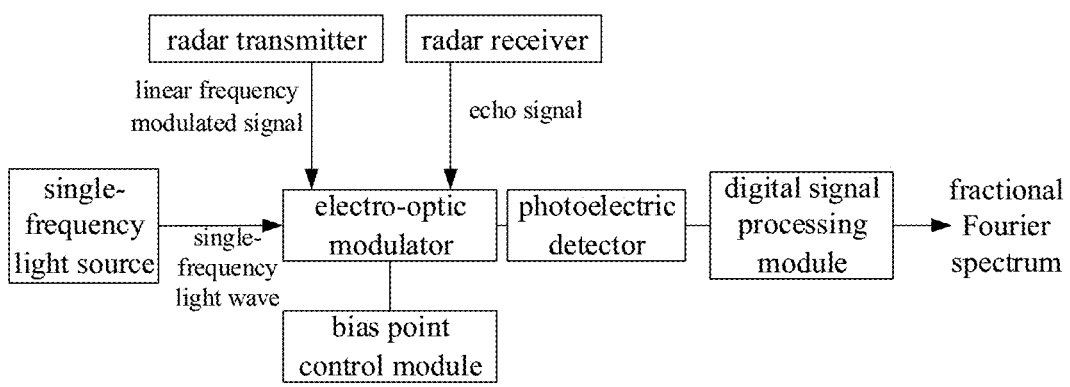
FIG. 6 is a structural schematic diagram of a system for processing a radar signal based on a photonic fractional Fourier transformer according to an embodiment of the disclosure.

FIG. 6 is a structural schematic diagram of a system for processing a radar signal based on a photonic fractional Fourier transformer according to an embodiment of the disclosure.

As shown in FIG. 6, the system for processing a radar signal based on a photonic fractional Fourier transform includes: a radar transmitter, a radar receiver, a single-frequency light source, an electro-optical modulator, a bias point control module, a photoelectric detector, a digital signal processing module.

The radar transmitter is configured to transmit a linear frequency modulated signal to targets to be measured.

The radar receiver is configured to receive echo signals of the targets to be measured.

The single-frequency light source is configured to generate and input a single-frequency light wave to the electro-optical modulator.

The bias point control module includes three tunable DC power supplies and is configured to bias a sub-modulator and a parent modulator in the electro-optical modulator at different bias points respectively.

The electro-optical modulator has an input end for inputting the single-frequency light wave, the linear frequency modulation signal and the echo signals, and an output end connected to an input end of the photoelectric detector. The electro-optical modulator is configured to modulate the single-frequency light wave based on the linear frequency modulation signal and the echo signals, and send the modulated single-frequency light wave to the photoelectric detector.

The photoelectric detector has an output end connected to an input end of a digital signal processing module. The photoelectric detector is configured to convert the optical signal into a photocurrent, and send the photocurrent to the digital signal processing module.

The digital signal processing module includes an analog-to-digital converter and a computer and is configured to obtain a fractional Fourier spectrum by performing Fourier transform on the photocurrent, and obtain distance information of the targets to be measured based on peak positions of each pulse signal in the fractional Fourier spectrum.

It may be understood that, except for the signal processing module, other devices may be integrated into an apparatus, with a simple and compact system structure. The signal processing module may be realized by a computer.

Figure 7:
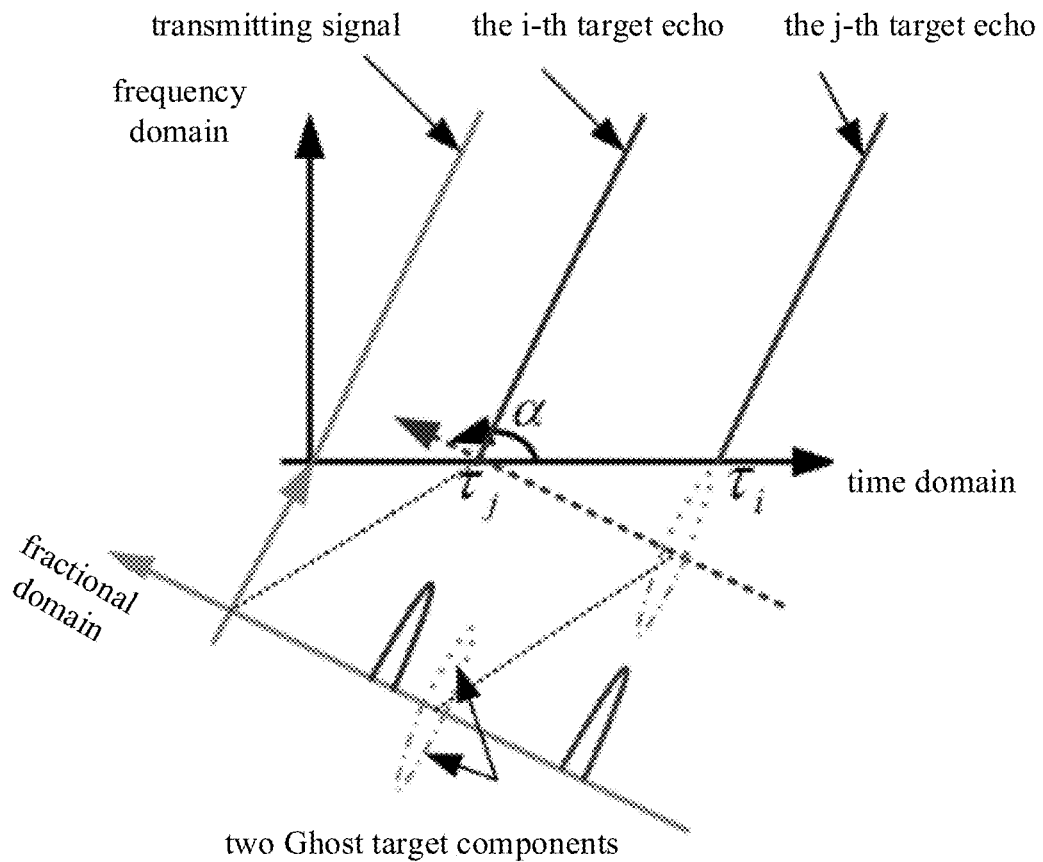
FIG. 7 is a working principle diagram of a photonic fractional Fourier transformer for radar detection without Ghost targets according to an embodiment of the disclosure.
Figure 8:
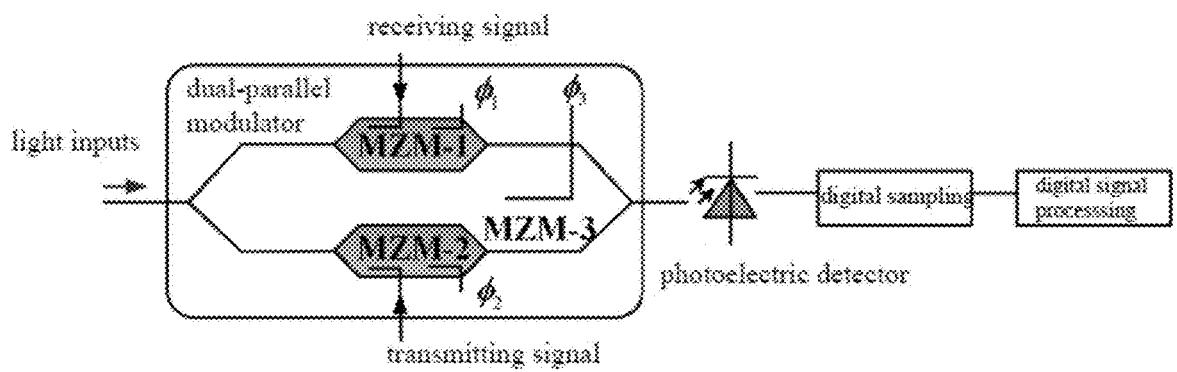
FIG. 8 is a structural schematic diagram of a photonic fractional Fourier transformer based on a dual-parallel Mach-Zehnder modulator (DPMZM) according to an embodiment of the disclosure.
Figure 9:
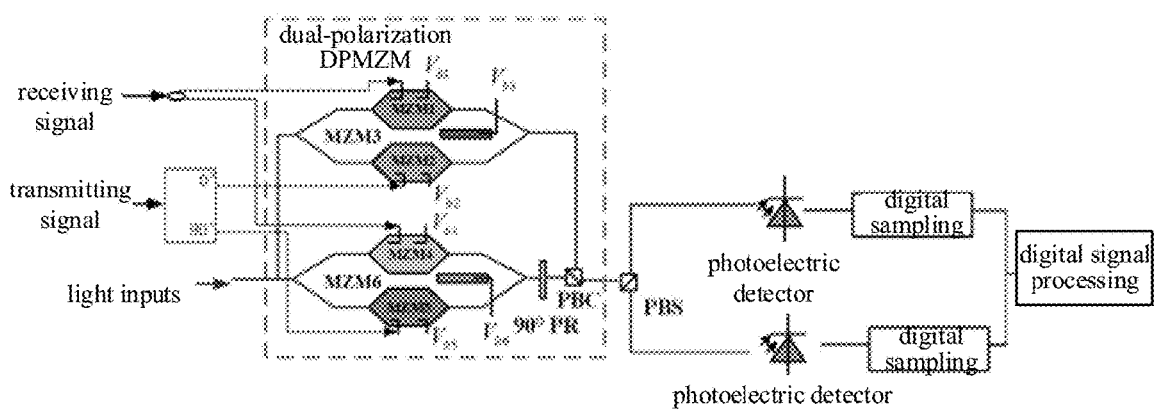
FIG. 9 is a structural schematic diagram of an I/Q photonic fractional Fourier transformer based on a dual-polarization DPMZM according to an embodiment of the disclosure.

As shown in FIG. 7, a working principle of a photonic fractional Fourier transformer for radar detection without Ghost targets. The two implementation structures of the photonic fractional Fourier transformer are shown in FIG. 8 and FIG. 9 respectively. FIG. 8 is a single-channel structure including one dual-parallel modulator. FIG. 9 is an extended structure of FIG. 8, which shows the structure of an I/Q photonic fractional Fourier Transformer based on a dual-polarization dual-parallel Mach-Zehnder modulator (DPMZM), which may achieve I/Q (in/quadrature) reception. A 50:50 electrical power splitter, a 90° bridge, a dual-polarization DPMZM, a polarization beam splitter, and 2 photoelectric detectors are included. In the single-channel structure in FIG. 8, transmitting signals and receiving signals are connected to two radio frequency input interfaces of the dual-parallel modulator, respectively, and the output of the dual-parallel modulator is directly connected to the input of the photoelectric detector. In the I/Q structure of FIG. 9, transmitting signals and receiving signals are divided into two paths after passing through the 90° bridge and the electrical power splitter, respectively, which are respectively input into two sub-double-parallel modulators of the double-polarization DPMZM. The output of the modulator is connected to the input of the polarization beam splitter (PBS), and two output ports of the polarization beam splitter are each connected to a photoelectric detector.

In the embodiment of the disclosure, a modulation rate of the electro-optical modulator is greater than the maximum frequency of the radar signal; the maximum frequency of the electrical power splitter shall be greater than the maximum frequency of the radar signal; the maximum frequency of the 90° bridge shall be greater than the maximum frequency of the radar signal; and a response rate of the photoelectric detector is greater than the bandwidth of the radar signal.

It should be noted that, the foregoing explanations of the method embodiments are also applicable to the system of this embodiment, and details are not repeated here.

According to the system for processing a radar signal based on a photonic fractional Fourier transformer proposed in the embodiment of the disclosure, the radar signals with high frequency and wide band may be converted into fractional-domain signals with low frequency and narrow band, and the interference of Ghost target components on the radar detection result may be eliminated. In addition, a small number of radio frequency electrical devices and optical devices are used, the system structure is simple and compact, and the bias points of the modulator are fixed, which is not affected by the number and characteristics of targets, and may be applied to complex detection scenarios of non-cooperative multiple targets.

Next, an apparatus for processing a radar signal based on a photonic fractional Fourier transformer according to the embodiments of the disclosure will be described with reference to the accompanying drawings.

Figure 10:
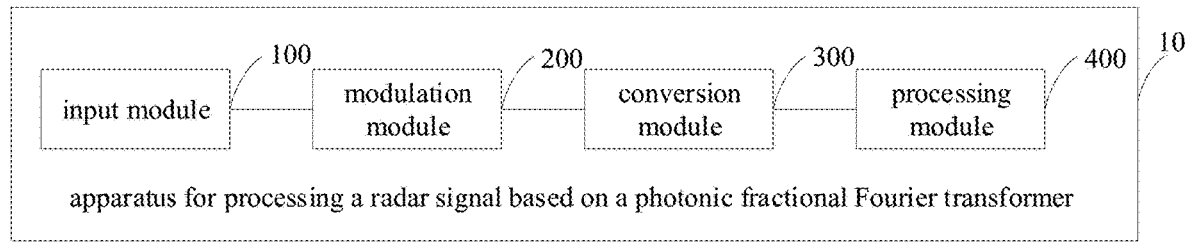
FIG. 10 is a structural schematic diagram of an apparatus for a processing radar signal based on a photonic fractional Fourier transformer according to an embodiment of the disclosure.

FIG. 10 is a structural schematic diagram of an apparatus for processing a radar signal based on a photonic fractional Fourier transformer according to an embodiment of the disclosure.

As shown in FIG. 10, the apparatus for processing a radar signal based on a photonic fractional Fourier transformer includes: an input module 100, a modulation module 200, a conversion module 300 and a processing module 400.

The input module 100 is configured to transmit a linear frequency modulated signal to targets to be measured, and receive echo signals of the targets to be measured, and load by an electro-optical modulator, the linear frequency modulated signal and the echo signals on a single-frequency light wave.

The modulation module 200 is configured to bias a sub-modulator and a parent modulator in the electro-optical modulator at different bias points, modulate by the electro-optical modulator, the single-frequency light wave and output the modulated optical signal.

The conversion module 300 is configured to convert by a photoelectric detector, the optical signal to a photocurrent.

The processing module 400 is configured to obtain a fractional Fourier spectrum by performing Fourier transform on the photocurrent, and obtain distance information of the targets to be measured based on peak positions of each pulse signal in the fractional Fourier spectrum.

Further, in this embodiment of the disclosure, the linear frequency modulated signal is:

$$s_0(t) = \exp j(2\pi f_0 t + \pi k t^2)$$

where $f_0$ is an initial frequency of the linear frequency modulated signal used, and k is a chirp rate of a linear frequency modulated waveform used; and
the echo signals are:

$$s_r(t) = \sum_{i=1}^{n} r_i \exp j\left[2\pi f_0(t - \tau_i) + \pi k(t - \tau_i)^2\right]$$

where $r_i$ is an amplitude of the i-th target echo, $\tau_i$ is a delay of the i-th target echo, and n is a number of targets.

Further, in the embodiment of the disclosure, biasing the electro-optical modulators respectively at different bias points further includes:

biasing two sub-modulators and the parent modulator in a dual-parallel electro-optical modulator at a quadrature bias point, a suppressed carrier point and a maximum transmission point, respectively.

Further, in the embodiment of the disclosure, the distance information of the targets to be measured is obtained based on the peak positions of each pulse signal in the fractional Fourier spectrum in a formula of $$L_i = \tau_i c/2 = |f_i' c/2k|$$

where $L_i$ is a distance between the i-th target and a transmitting point of the linear frequency modulated signal, $f_i'$ is a peak position of the i-th target in the fractional Fourier spectrum, c is the light speed, and $\tau_i$ is the delay from the delay of the i-th target echo, and k is a chirp rate of the linear frequency modulated waveform used.

It should be noted that the foregoing explanations of the method and system embodiments are also applicable to the apparatus of this embodiment, which are not repeated here.

According to the apparatus for processing a radar signal based on a photonic fractional Fourier transformer in the embodiment of the disclosure, the linear frequency modulated signal is transmitted to the targets to be measured, the echo signals of the targets to be measured are received, the linear frequency modulated signal and the echo signals are loaded by the electro-optical modulator on the single-frequency light wave; the sub-modulator and the parent modulator in the electro-optical modulator are biased at different bias points, the single-frequency light wave is modulate by the electro-optical modulator, and the modulated optical signal is outputted; the optical signal is converted by the photoelectric detector to the photocurrent; the fractional Fourier spectrum is obtained by performing Fourier transform on the photocurrent, and the distance information of the targets to be measured is obtained based on the peak positions of each pulse signal in the fractional Fourier spectrum. Thus, the radar signals with high frequency and wide band are converted into fractional-domain signals with low frequency and narrow band, and the interference of Ghost target components on the radar detection results is eliminated.

In addition, the terms "first" and "second" are only used for descriptive purposes, and should not be construed as indicating or implying relative importance or implying the number of indicated technical features. Thus, a feature delimited with "first", "second" may expressly or implicitly include at least one of said feature. In the description of the disclosure, "a plurality of" means at least two, such as two, three, etc., unless expressly and specifically defined otherwise.

In the description of this specification, description with reference to the terms "one embodiment," "some embodiments," "example," "specific example," or "some examples", etc., mean specific features described in connection with the embodiment or example, structure, material or feature is included in at least one embodiment or example of the disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may integrate and combine the different embodiments or examples described in this specification, as well as the features of the different embodiments or examples, without conflicting each other.

Although the embodiments of the disclosure have been shown and described above, it may be understood that the above-mentioned embodiments are exemplary and should not be construed as limitations to the disclosure. Those skilled in the art may make changes, modifications, substitutions, and modifications to the above embodiments within the scope of the disclosure.

What is claimed is:

1. A method for processing a radar signal based on a photonic fractional Fourier transformer, comprising:
   transmitting, by a radar transmitter, a linear frequency modulated signal to targets to be measured, and receiving, by a radar receiver, echo signals of the targets to be measured, and loading, by an electro-optical modulator, the linear frequency modulated signal and the echo signals on a single-frequency light wave generated by a single-frequency light source;
   biasing the electro-optical modulator at different bias points respectively, modulating, by the electro-optical modulator, the single-frequency light wave based on the linear frequency modulated signal and the echo signals, and outputting a modulated optical signal;
   converting, by a photoelectric detector, the modulated optical signal to a photocurrent; and
   obtaining a fractional Fourier spectrum by performing Fourier transform on the photocurrent, and obtaining distance information of the targets to be measured based on peak positions of each pulse signal in the fractional Fourier spectrum;
   wherein the electro-optical modulator is a dual-parallel electro-optical modulator, and biasing the electro-optical modulator at different bias points, respectively further comprises:
      biasing two sub-modulators of the dual-parallel electro-optical modulator at a quadrature bias point and a suppressed carrier point respectively, and biasing a parent modulator of the dual-parallel electro-optical modulator at a maximum transmission point.

2. The method of claim 1, wherein the linear frequency modulated signal is:

$$s_0(t) = \exp j(2\pi f_0 t + \pi k t^2),$$

where $f_0$ is an initial frequency of the linear frequency modulated signal used, and k is a chirp rate of a linear frequency modulated waveform used; and
the echo signals are:

$$s_r(t) = \sum_{i=1}^{n} r_i \exp j[2\pi f_0(t-\tau_i) + \pi k(t-\tau_i)^2],$$

where $r_i$ is an amplitude of the i-th target echo, $\tau_i$ is a delay of the i-th target echo, and n is a number of targets.

3. The method of claim 1, wherein the distance information of the targets to be measured is obtained based on the peak positions of each pulse signal in the fractional Fourier spectrum in a formula of $$L_i = \tau_i c/2 = |f_i' c/2k|,$$

where $L_i$ is a distance between the i-th target and a transmitting point of the linear frequency modulated signal, $f_i'$ is a peak position of the i-th target in the fractional Fourier spectrum, c is the light speed, and $\tau_i$ is a delay of the i-th target echo, and k is a chirp rate of a linear frequency modulated waveform used.

4. The method of claim 1, wherein phases corresponding to the two sub-modulators and the parent modulator of the dual-parallel electro-optical modulator are biased as $$\phi_1 = \pi/4, \phi_2 = \pi/2, \phi_3 = 0.$$

5. A system for processing a radar signal based on a photonic fractional Fourier transformer, comprising:
   a radar transmitter, configured to transmit a linear frequency modulated signal to targets to be measured;
   a radar receiver, configured to receive echo signals of the targets to be measured;
   a single-frequency light source, configured to generate and input a single-frequency light wave to an electro-optical modulator;
   a bias point control module, comprising three tunable DC power supplies, and configured to bias the electro-optical modulator at different bias points respectively;
   wherein the electro-optical modulator, having an input end for inputting the single-frequency light wave, the linear frequency modulated signal and the echo signals, and an output end connected to an input end of a photoelectric detector, is configured to modulate the single-frequency light wave based on the linear frequency modulation signal and the echo signals, and send a modulated optical signal to the photoelectric detector;
   the photoelectric detector, having an output end connected to an input end of a digital signal processing module, is configured to convert the modulated optical signal into a photocurrent, and send the photocurrent to the digital signal processing module; and
   the digital signal processing module, comprising an analog-to-digital converter and a computer, is configured to obtain a fractional Fourier spectrum by performing Fourier transform on the photocurrent, and obtain distance information of the targets to be measured based on peak positions of each pulse signal in the fractional Fourier spectrum;
   wherein the electro-optical modulator is a dual-parallel electro-optical modulator, and
   the bias point control module is further configured to bias two sub-modulators of the dual-parallel electro-optical modulator at a quadrature bias point and a suppressed carrier point respectively, and bias a parent modulator of the dual-parallel electro-optical modulator at a maximum transmission point.

6. The system of claim 5, wherein the electro-optical modulator comprises a single-channel dual-parallel modulator and a dual-polarization dual-parallel Mach-Zehnder modulator.

7. The system of claim 5, wherein the linear frequency modulated signal is:

$$s_0(t) = \exp j(2\pi f_0 t + \pi k t^2),$$

where $f_0$ is an initial frequency of the linear frequency modulated signal, and k is a chirp rate of a linear frequency modulated waveform; and
the echo signals are:

$$s_r(t) = \sum_{i=1}^{n} r_i \exp j[2\pi f_0(t-\tau_i) + \pi k(t-\tau_i)^2],$$

where $r_i$ is an amplitude of the i-th target echo, $\tau_i$ is a delay of the i-th target echo, and n is a number of targets.

8. The system of claim 5, wherein the distance information of the targets to be measured is obtained based on the peak positions of each pulse signal in the fractional Fourier spectrum in a formula of $$L_i = \tau_i c/2 = |f_i' c/2k|,$$

where $L_i$ is a distance between the i-th target and a transmitting point of the linear frequency modulated signal, $f_i'$ is a peak position of the i-th target in the fractional Fourier spectrum, c is the light speed, and $\tau_i$ is a delay of the i-th target echo, and k is a chirp rate of a linear frequency modulated waveform.

9. The system of claim 5, wherein phases corresponding to the two sub-modulators and the parent modulator of the dual-parallel electro-optical modulator are biased as $$\phi_1 = \pi/4, \phi_2 = \pi/2, \phi_3 = 0.$$

* * * * *